United States Patent [19]

Coquard et al.

[11] 4,343,743

[45] Aug. 10, 1982

[54] NOVEL POLYESTERAMIDES HAVING LOW GLASS TRANSITION TEMPERATURES

[75] Inventors: Jean Coquard, Grezieu la Varenne; Jean Goletto, Ecully, both of France

[73] Assignee: Rhone-Poulenc Industries, Paris, France

[21] Appl. No.: 213,472

[22] Filed: Dec. 5, 1980

[30] Foreign Application Priority Data

Dec. 10, 1979 [FR] France ................. 79 30650

[51] Int. Cl.$^3$ ................................. C09J 3/16
[52] U.S. Cl. ................... 260/404.5; 528/288; 528/295.3
[58] Field of Search ........... 260/18 N, 404.5 PA, 260/407

[56] References Cited

U.S. PATENT DOCUMENTS

| | | | |
|---|---|---|---|
| 3,637,551 | 1/1972 | Sprauer | 260/404.5 |
| 3,650,999 | 3/1972 | Martins | 428/423.1 |
| 4,045,389 | 8/1977 | Drawert et al. | 260/404.5 |
| 4,218,351 | 8/1980 | Rasmussen | 260/404.5 |

*Primary Examiner*—John F. Niebling
*Attorney, Agent, or Firm*—Burns, Doane, Swecker & Mathis

[57] ABSTRACT

Random or regularly recurring block polyesteramides having glass transition temperatures at least as low as $-30°$ C. are prepared from (i) essentially difunctional monomers comprising at least one carboxylic acid function, or ester/amide-forming derivative thereof, at least 1 mol % of which comprising dicarboxylic acids or such derivatives thereof and having from 20 to 60 carbon atoms, with the amount of monofunctional carboxylic acids comprising said carboxyl monomers being less than about 1% by weight and the amount of carboxylic acids having in excess of two functional groups being less than about 5% by weight, and (ii) a member selected from the group consisting of dihydroxyl and diamino comonomers therefor, or aminoalcohol comonomers, or mixtures of diamino and aminoalcohol comonomers.

19 Claims, No Drawings

NOVEL POLYESTERAMIDES HAVING LOW GLASS TRANSITION TEMPERATURES

BACKGROUND OF THE INVENTION

1. Field of the Invention

The present invention relates to novel copolyesteramides having a random or alternately regularly recurring block structure, and which have a high molecular weight and significant flexibility and elasticity down to temperatures which are below or equal to −30° C.

2. Description of the Prior Art

Copolyesteramides having glass transition temperatures below 0° C. have already been described in the literature. For example, U.S. Pat. No. 3,650,999 notes block copolyesteramides, the crystalline phase of which consists of polyester units and the amorphous phase consisting of polyamide units. However, copolymers of this type lose all flexibility and pliability at between −10° C. and −20° C. Furthermore, their relatively low molecular weight only enables them to be used as adhesives.

Likewise, French Pat. No. 77/22,305 describes thermoplastic elastomers consisting of block copolyesteramides. These polymers possess valuable properties, in particular flexibility at low temperature. However, their moduli are not generally sufficiently low and their heterogeneity in molten state makes them difficult to prepare.

Thus, for certain applications, serious need exists in this art for thermoplastic elastomers which have good cohesion while at the same time remain pliable down to temperatures below −30° C.

SUMMARY OF THE INVENTION

Accordingly, a major object of the present invention is the provision of novel polyesteramides having a random or alternately regularly recurring block structure, and having a glass transition temperature below −30° C., such polyesteramides being characterized in that they are prepared from (i) essentially difunctional reactants or monomers which have at least one carboxylic acid group, or ester- or amide-forming derivative thereof, at least 1 mol % of which comprising diacids, or such derivatives thereof, having from 20 to 60 carbon atoms, with the amount of monofunctional carboxylic acids comprising said carboxyl reactants being less than about 1% by weight, preferably less than about 0.2% by weight, and the amount of carboxylic acids having in excess of two functional groups being less than about 5% by weight, preferably less than about 3% by weight, and (ii) either dihydroxyl and diamino comonomers, or aminoalcohol comonomers, or mixtures of diamino and aminoalcohol comonmers.

DETAILED DESCRIPTION OF THE INVENTION

More particularly according to this invention, by the expression "essentially difunctional monomers" there is intended that, among such reactants comprising an acid function, there can be included a minor proportion of monofunctional or polyfunctional reactants or monomers, provided that the characteristics of the resultant polyesteramide obtained with these mixtures are essentially unmodified vis-a-vis a polyesteramide prepared from only difunctional reactants.

By the expression "comprising at least one carboxylic acid function" there is intended that the essentially difunctional monomers can contain, in addition to a carboxyl group, ester-forming or amide-forming groups, hydroxyl or amine groups, or derivatives thereof.

The expression "acid group or derivative thereof" is intended to connote anhydride, ester or lactam groups.

Dimeric acids are preferred among the diacids having from 20 to 60 carbon atoms.

The term "dimeric acids" is intended to connote polymeric fatty acids obtained by the fractionation of fatty acids and containing more than about 95% by weight of dimers. The term fatty acids is intended to connote saturated or unsaturated aliphatic monoacids having from 8 to 24 carbon atoms.

Among the linear or branched chain saturated fatty acids envisaged, representative are: caprylic, pelargonic, capric, lauric, myristic, palmitic and isopalmitic, stearic, arachidic, behenic and lignoceric acids.

Among the linear or branched chain fatty acids having ethylenic unsaturation, representative are: oct-3-enoic, dodec-11-enoic, lauroleic, myristoleic, palmitoleic, gadoleic, cetoleic, linoleic, linolenic, eicosatetraenoic and chaulmoogric acids. Certain acids having acetylenic unsaturation can also provide polymeric acids, but these do not exist as a practical matter in the natural state and their economic value is therefore very low.

The polymeric fatty acids obtained by polymerization, most typically in the presence of peroxides or Lewis acids, can be fractionated. They can also be hydrogenated in order to reduce their degree of unsaturation and thus to reduce their coloration.

The most advantageously used starting materials are hydrogenated compositions derived from oleic and linoleic acids and which contain: from 1 to 15% by weight of monobasic acid, from 80 to 98% by weight of dibasic acid and from 1 to 25% by weight of tribasic acid or acids of higher basicity.

Compositions in which the fraction of dimeric acid is greater than 95% will preferably be used according to the invention. Dimeric acids in which the proportion of monofunctional acid is less than 1% by weight, and in which the proportion of acid with more than two functional groups is less than 5% by weight and preferably less than 3% by weight, are more preferred.

The other reactants containing carboxylic acid groups can be diacids, aminoacids, aminoalcohols or their ester-forming or amide-forming derivatives. These reactants can have an aliphatic or cycloaliphatic chain or a chain of aromatic structure, which is not directly bonded to the functional groups.

The dihydroxyl compounds are essentially compounds with an aliphatic, cycloaliphatic or aromatic chain which is not directly bonded to the hydroxyl groups, and having a molecular weight which is typically less than 500, or macromolecular dihydroxyl compounds having a molecular weight which is generally between 500 and 5,000, such as, for example, polyetherdiols, such as tetrahydrofuran, polyoxyethylene glycols, polyoxypropylene glycols or polylactones.

The diamine compounds are selected from among diamines with an aliphatic or cycloaliphatic chain or a chain of aromatic structure, which is not directly bonded to the amino groups.

Likewise, the aminoalcohols have an aliphatic or cycloaliphatic chain or a chain of aromatic structure, the amine group not being bonded directly to the ring.

The copolymers according to the invention can possess both good cohesion and good pliability. To do this, a compromise must be found in the relative proportions of the polyester segments and the polyamide segments. The proportion by weight of polyester segments will advantageously be between 20% and 80% and, if it is desired to prepare elastomers of low moduli, preferably between 50% and 80%.

For the calculation of these proportions by weight of ester and amide segments, it will be assumed that the ester segments are derived from a carboxylic acid by the loss of one OH and from an alcohol by the loss of one H, that the amide segments are derived from a carboxylic acid by the loss of one OH and from an amine by the loss of one H, and that the structures forming part of both ester and amide segments, with the exception of the —CO—, —NH— and —O— groups (functional radicals), are divided up equally between these ester and amide segments.

In the polyesteramides according to the invention, the cohesion is essentially provided by the amide segments. Thus, in the proportions by weight indicated above, which are between 20 and 80%, it will also be possible to vary the composition of the amide segments, within certain limits, in order to obtain the selected mechanical properties. It will thus also be possible to increase the cohesion by selecting, for the production of amide segments, a proportion, which can range up to 99% of the reactants with carboxylic acid groups or derivatives thereof, of diacids or aminoacids or lactams with short claims which can have, for example, a number of carbon atoms which is less than or equal to 12.

Short-chain acids which are representative are oxalic, malonic, succinic, glutaric, adipic, pimelic, suberic, azelaic, sebacic and dodecanedioic acids, and aminoacids which are representative are aminocaproic acid, 9-aminononanoic acid, 11-aminoundecanoic acid and 12-aminododecanoic acid.

Lactams which are representative are caprolactam, enantholactam, capryllactam, ω-aminopelargonic acid, ω-aminoundecanoic acid or lauryllactam.

Various processes can be used for the preparation of the polyesteramides according to the invention.

The presence of dimeric acid generally increases the compatibility of the various constituents and makes it possible to obtain polymers of high molecular weight with reaction times, in vacuo, which are generally less than 2 or 3 hours. The secondary reactions leading to highly colored products of low molecular weight, which reactions are frequent during the preparation of polyesteramides obtained from diacids having fewer than 6 carbon atoms and of diols with short chains (of less than or equal to 4 carbons), are of little importance, if not nonexistent, in the case of the polyesteramides according to the invention. The structures obtained furthermore have a good stability to hydrolysis.

The polycondensation/esterification reaction can be carried out from a mixture of all of the reactants, in which case an essentially random structure is obtained.

It is also possible to initially form amide blocks and then to carry out the esterification reaction, in which case an essentially random block structure is obtained if the amide blocks have acid end groups, or an essentially alternately block structure is obtained if the amide blocks are first esterified. A process of this type is described in U.S. Pat. No. 3,849,514.

It is also possible to start from preformed diesteramides, such as those described in Belgian Pat. No. 857,005, the general formula of which is:

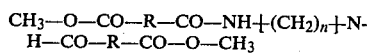

in which n is an integer between 2 and 12 inclusive and R is a divalent aliphatic radical $(CH_2)_m$, m being an integer between 2 and 12 inclusive, or a divalent aromatic radical bonded in the meta or para positions, or a divalent cycloaliphatic radical bonded in the 1,3-or 1,4-positions.

An example of a diesterdiamide of this type is N,N'-bis-(para-carbomethoxybenzoyl)-hexamethylenediamine.

It is also envisaged to couple polyamide blocks and polyester blocks having a molecular weight of between 500 and 5,000.

The diacid having between 20 and 60 carbon atoms can be totally employed in the ester sequences or totally employed in the amide sequences or distributed between the two types of sequence.

Depending on the composition and the process used, polyesteramides having elastomeric properties which can vary and can be adjusted as desired will be obtained. However, the main value of these thermoplastic elastomers is that these elastomeric properties are retained down to temperatures of the order of $-30°$ C.

Thus, the polyesteramides with alternate blocks, containing crystalline amide blocks obtained from acid reactants having fewer than 12 carbon atoms, constitute a particularly valuable class because they also possess a very good cohesion.

The polyesteramides according to the invention can be used in various applications in which their good mechanical and impact strength properties at low temperature are of value. Used by themselves, these polyesteramides make it possible to obtain textile filaments, films, other shaped articles, coatings, adhesives and the like.

With semi-crystalline polyesteramides, it is possible to prepare adhesives of the hot melt type or coatings. These polyesteramides can also be used to reinforce numerous other polymers, such as polyamides or polyolefins, imparting a combination of particularly valuable properties to the compositions thus obtained.

In order to further illustrate the present invention and the advantages thereof, the following specific examples are given, it being understood that same are intended only as illustrative and in nowise limitative.

In the following examples, a certain number of determinations were carried out. Likewise, various properties were measured. The procedures or specifications in accordance with which the aforesaid determinations and measurements were carried out are indicated below.

1. Determination of inherent viscosity

The dried polymer is dissolved in meta-cresol in such amount as to provide a 0.5% strength solution. The flow time of this solution is measured in comparision with that of the pure solvent. The value of the inherent viscosity is given by the formula:

$$\eta\text{inh.} = 4.6 \, (\log t_1 - \log t_0)$$

$t_1$ = flow time of the solution $t_0$=flow time of the solvent

It is expressed in dl/g.

2. Microcalorimetric analysis

The polymers or the mixtures of polymers are characterized by their intrinsic viscosity and also by melting characteristics, such as the melting endotherms Em.

These determinations are carried out on a sample subjected to both increasing and decreasing temperature variations of 10° C./minute. A curve, on which the melting endotherms can be identified, is thus determined by differential microcalorimetry.

3. Glass transition temperature

The glass transition temperature corresponds to the sudden drop in the shear modulus as a function of the temperature. It can be determined from the graph representing the variations in the torsional modulus as a function of the temperature, these variations being measured by thermomechanical analysis using an automatic torsion pendulum.

4. Softening point

This is determined using a Kofler bench.

5. Shear modulus under torsion

This is determined at three temperatures, namely, at −20° C., 0° C. and +20° C., using an automatic torsion pendulum at a frequency of the order of 1 Hertz, in accordance with ISO Standard Specification R 537.

6. Determination of end groups $NH_2$: Automatic potentiometric determination of the solution of polymer in a 90/10 by weight mixture of phenol and water, using HCl. The result is given in milligram equivalents per $10^3$ g of polymer.

COOH: Hot dissolution of the polymer in benzyl alcohol, under a nitrogen atmosphere, and acidimetric determination of this hot solution, under nitrogen, using a glycolic solution of potassium hydroxide in the presence of phenolphthalein. The result is given in miligram equivalents per $10^3$ g of polymer.

EXAMPLE 1

Preparation of polyesteramide from dimeric acid, hexane-1,6-diol and hexamethylenediamine The reaction was carried out in a stirred glass reactor adopted for operation in vacuo.

The following ingredients were introduced at ambient temperature:

(i) 40.3 g (0.07 mol) of a fatty acid dimer having a monomer content of 0.03% and a trimer content of about 3% (marketed by Unilever Emery under the name Empol 1010); this acid dimer, which will be referred to as "dimeric acid", was used in the following examples;

(ii) 4.06 g (0.035 mol) of hexamethylenediamine;

(iii) 5.9 g (0.05 mol) of hexane-1,6-diol; and (iv) 10 mg of titanium glycolate (catalyst).

The apparatus was carefully purged with nitrogen, the reaction mass was stirred and its temperature was raised to 260° C. over the course of 1 hour 30 minutes. A vacuum was then established until it reached 0.5 mm of mercury, and polycondensation was carried out at 260° C. for 1 hour 30 minutes. The resulting polymer was homogenous and possessed rubbery properties. Its characteristics are reported in the Table which follows.

EXAMPLE 2

Preparation of polyesteramide from dimeric acid, ethylene glycol and hexamethylenediamine The reaction was carried out in a 7.5 liter stainless steel autoclave fitted with an anchor-type stirrer equipped with a tachometric dynamo.

The following reactants were introduced into the autoclave at ambient temperature:

| Dimeric acid: | 892.04 g (1.289 mols) |
|---|---|
| Pure crystalline hexamethylenediamine: | 141.23 g (1.217 mols) |

The amount of these reactants introduced was calculated such as to provide a prepolyamide having a molecular weight of 3,000, and containing COOH end groups.

The reactants were introduced at ambient temperature, the apparatus was carefully purged with nitrogen and the temperature of the reaction mass was then raised to 270° C. over the course of 2 hours, under stirring. The reaction mass was subsequently maintained at 270° for 45 minutes and then reduced to ambient temperature.

The following reactants were then introduced into the autoclave:

| Dimeric acid: | 1,915.6 g (3.323 mols) |
|---|---|
| Ethylene glycol: | 339.7 g (5.478 mols) |
| Titanium glycolate: | 0.5 g |

The apparatus was again carefully purged with nitrogen and the temperature of the reaction mass was then raised to 200° C. over the course of 1 hour 15 minutes, under stirring, in order to effect distillation of the water of reaction. The temperature was then raised to 270° over the course of 1 hour 15 minutes. A vacuum was then established over the course of 1 hour 30 minutes until it reached 0.4–0.5 mm Hg. Polycondensation was then carried out at 270° C. for 1 hour 15 minutes under 0.4–0.5 mm Hg.

The polymer was subsequently drawn off under nitrogen pressure and collected in water, and it was then converted to granules after cooling in liquid nitrogen.

The characteristics of the resulting product are reported in the Table which follows.

EXAMPLE 3

Preparation of polyesteramide from dimeric acid, sebacic acid, ethylene glycol and hexamethylenediamine (HMD)

In a first stage, a polyamide of dimeric acid/sebacic acid (70/30 w/w) and hexamethylenediamine was prepared under the conditions required to obtain a molecular weight of 2,000 and a polyamide with COOH end groups.

The following reactants were introduced into a 1 liter Pyrex reactor at ambient temperature:

| Dimeric acid: | 319.4 g (0.554 mol) |
|---|---|
| Sebacic acid: | 260.2 g (1.288 mols) |
| Pure crystalline HMD: | 170 g (1.467 mols) |

The apparatus was carefully purged with nitrogen and the temperature of the mass was raised to 265° over the course of 2 hours, under stirring. The resulting reaction mass was perfectly homogeneous. Same was maintained at 265° C. for 1 hour 15 minutes. The resulting polymer was drawn off into water and then ground and dried at 100° in an oven in vacuo. The characteristics of the resulting copolyamide were as follows:

| | |
|---|---|
| COOH end groups: | 982.5 meq/kg |
| NH$_2$ end groups: | 2.8 meq/kg |
| Mp by differential thermal analysis: | 185° C. |
| Molecular weight based on end groups: | 2,070 |

The following reactants were introduced into a 7.5 liter stainless steel autoclave at ambient temperature:

| | |
|---|---|
| Prepolyamide, previously prepared: | 522.6 g |
| Ethylene glycol: | 307.7 g (4.962 mols) |
| Dimeric acid: | 1,744.5 g (3.026 mols) |
| Titanium glycolate: | 0.414 g |

The apparatus was carefully purged with nitrogen, the reaction mass was stirred and the temperature of the reaction mass was raised to 270° C. over the course of 2 hours 15 minutes. A vacuum was established over the course of 1 hour 15 minutes until it reached 0.3 mm Hg. Stirring was maintained for 2 hours 30 minutes at 270° C. under 0.3 mm Hg. The polymer was subsequently drawn off under nitrogen pressure, collected in water and then converted to granules after cooling with liquid nitrogen.

The characteristics of the resulting product are also reported in the Table which follows.

EXAMPLE 4

Preparation of polyetheresteramide from dimeric acid, polytetrahydrofuran (poly-THF), sebacic acid and ethylene glycol (1) Condensation of dimeric acid and poly-THF of molecular weight 2,000:

The following reactants were introduced into a 7.5 liter stainless steel autoclave:

| | |
|---|---|
| Dimeric acid: | 1,180.7 g (2.048 mols) |
| Poly-THF (of trademark TERACOL 2000): | 2,048 g (1.024 mols) |

The apparatus was carefully purged with nitrogen, the reaction mass was stirred and its temperature was raised to 250° C. over the course of 2 hours. A vacuum was then established over the course of 1 hour until it reached 0.3 mm Hg. The reaction mass was maintained at 250° C. for 2 hours under 0.3 mm Hg. The reaction mass was then reduced in temperature back to ambient temperature. The determination of the COOH groups, carried out on the residue, indicated 0.0642 COOH/100 g.

(2) 2,800 g of the product prepared above were retained in the same autoclave and the following reactants were then added thereto:

| | |
|---|---|
| Polyamide of dimeric acid/ sebacic acid and hexamethylenediamine, of molecular weight 2,000 and containing COOH end groups (identical to the polyamide described in the preceding example): | 650 g (0.06857 COOH) |
| Ethylene glycol: | 154 g (2.4833 mols) |
| Titanium glycolate: | 0.945 g |

The apparatus was carefully purged with nitrogen and the temperature of the reaction mass was raised to 250° C. over the course of 1 hour and then maintained for 1 hour. A vacuum was then established over the course of 1 hour 15 minutes until it reached 0.3 mm Hg. Polycondensation was carried out at 250° C. for 1 hour 45 minutes under 0.3 mm Hg. The polymer was drawn off under nitrogen pressure, cooled in water and then converted to granules after being conveyed through a mixture of acetone and solid carbon dioxide. The characteristics of the resulting product are also reported in the Table which follows.

EXAMPLE 5

Preparation of polyetheresteramide from poly-THF, sebacic acid and ethylene glycol (a) Condensation of dimeric acid and poly-THF (of molecular weight 1,000):

The following reactants were introduced into a 7.5 liter autoclave:

| | |
|---|---|
| Dimeric acid: | 1,634 g (2.384 mols) |
| Poly-THF (TERACOL 1000): | 1,417 g (1.417 mols) |

The procedure was identical to that described above. The determination of the COOH groups, carried out on the residue, indicated a proportion of 0.0877 COOH per 100 g.

(b) 2,796 g of the above product were retained in the same autoclave and the following reactants were added:

| | |
|---|---|
| Polyamide of dimeric acid/ sebacic acid and hexamethylenediamine, of molecular weight 2,000 and containing COOH end groups: | 649 g |
| Ethylene glycol: | 194 g |
| Titanium glycolate: | 0.945 g |

The procedure was identical to that described above. Polycondensation was carried out at 250° C. for 2 hours 40 minutes under 0.1–0.15 mm Hg. The product was collected under the same conditions and the characteristics thereof are also reported in the Table which follows.

EXAMPLES 6 AND 7

Polyesteramide from N,N'-bis-(carbomethoxybenzoyl)hexamethylenediamine, hexane-1,6-diol and dimeric acid This type of polyesteramide consisted of rigid units obtained by reacting:

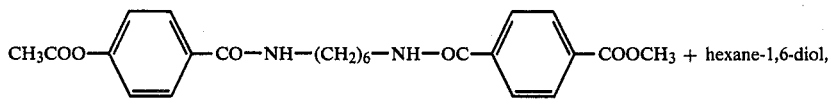

[N,N'-Bis-(carbomethoxybenzoyl)-HMD]

and of flexible units obtained by reacting dimeric acid and hexane-1,6-diol.

It should be noted that it is possible, depending on the composition, to obtain a whole range of products, the rigidity of which decreases when the proportion of flexible units increases.

EXAMPLE 6 (75% of flexible units/25% of rigid units)

The following ingredients were introduced, at ambient temperatures, into a stirred 100 ml Pyrex reactor equipped for operation under high vacuum:

| N,N'-Bis-(carbomethoxy-benzoyl)-HMD: | 8.91 g |
|---|---|
| Hexane-1,6-diol: | 11.64 g |
| Titanium glycolate: | 10 mg |

After nitrogen purge, the temperature was raised to 240° over the course of 1 hour 15 minutes, under stirring, and stirring was contained at 240° C. for 1 hour. The resulting reaction mass was perfectly limpid.

The reaction mass was decreased in temperature back to ambient temperature and 26.2 g (0.0455 mol) of dimeric acid were added. The apparatus was again purged with nitrogen and the temperature was raised to 270° over the course of 1 hour 30 minutes, under stirring, and maintained at 270° for 1 hour. A vacuum was established over the course of 30 minutes until it reached 0.3 mm Hg, and polycondensation was carried out at 270° C. for 2 hours under 0.25–0.3 mm Hg. The reaction mass obtained upon completion of the reaction was homogeneous. When cold, the product was pliable and retained good properties up to a temperature of 150°–160° C.

EXAMPLE 7 (50% of flexible units/50% of rigid units)

The following ingredients were introduced into a reactor identical to the previous reactor:

| N,N'-Bis-(carbomethoxy-benzoyl)-HMD: | 17.81 g (0.0404 mol) |
|---|---|
| Hexane-1,6-diol: | 12.54 g (0.1062 mol) |
| Titanium glycolate: | 10 mg |

The procedure was identical to that described above. For the 2nd stage, dimeric acid (0.03067 mol) was added and polycondensation was carried out at 270° C. for 1 hour 30 minutes under 0.2–0.3 mm Hg. The resulting polymer was homogeneous, had a melting point of 210° C. and retained good mechanical properties up to 180° C.

The properties of the resulting products are reported in the Table which follows.

EXAMPLE 8

Preparation of polyesteramide based on caprolactam, dimeric acid, poly-THF and hexane-1,6-diol (1) Preparation of prepolyamide based on caprolactam and dimeric acid:

A prepolyamide having the following structure was prepared:

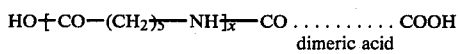
dimeric acid x is about 8 for a molecular weight of about 1,500.

The following ingredients were introduced, at ambient temperature, into a small glass reactor adopted for operation in vacuo and fitted with a stainless steel anchor stirrer: 35.5 g of caprolactam, 3.5 g of aminocaproic acid and 14.40 g of dimeric acid. Nitrogen purges were carried out and a slow stream of nitrogen was maintained. The temperature of the reaction mass was raised to 270° C. (and this temperature was maintained for 1 hour 30 minutes, under stirring). A vacuum was then established down to about 10 mm of mercury over the course of 30 minutes and same was maintained for 10 minutes. The reaction mass was then cooled under a stream of nitrogen.

The resulting prepolymer had a proportion of COOH groups of 1330 meq/Kg and a proportion of NH$_2$ groups which was undetectable by the method indicated.

(2) Preparation of polyesteramide 20 g of the above prepolyamide, 10 g of poly-THF (TERACOL 1000), 1 g of hexane-B 1,6-diol and 10 mg of titanium glycolate were introduced into the equipment described above. Nitrogen purges were carried out. The temperature of the reaction mass was then raised to 260° C. over the course of 40 minutes; a vacuum was established over the course of 45 minutes until it reached 0.3 mm of mercury, and polycondensation was carried out at 260° C. for 1 hour under 0.3 mm of mercury. The polyesteramide reached a significant melt viscosity upon completion of the reaction and it was transparent and only weakly colored. When cold, the polymer was pliable and possessed elastomeric properties.

The properties of the resulting product are reported in the Table which follows.

EXAMPLE 9

Preparation of polyesteramide from a prepolyamide with hydroxyl end groups and a prepolyester with hydroxyl end groups In this example, a polyesteramide composed of 50% by weight of ester units and 50% by weight of amide units was prepared from a prepolyamide of molecular weight 2,500, which consisted of 50% by weight of a prepolyamide of dimeric acid and hexamethylenediamine (HMD) and 50% by weight of a prepolyamide of sebacic acid and HMD, and in which the carboxylic acid end groups had been esterified with hexane-1,6-diol. The prepolyester had a molecular weight of 2,500 and was prepared from dimeric acid and hexane-1,6-diol.

The prepolyamide and the prepolyester of molecular weight 2,000 were prepared in a first stage.

The following ingredients were introduced into a reactor identical to that described in Example 6:

| | |
|---|---|
| Prepolyamide of molecular weight 2,500, containing OH end groups: | 20 g |
| Prepolyester of molecular weight 2,000, containing OH end groups: | 20 g |
| Hexane-1,6-diol: | 1.6 g |
| Titanium glycolate: | 10 mg |

After purges with nitrogen, the temperature of the reaction mass was raised to 260° C. over the course of 1 hour, under stirring; same was maintained at 260° for 1 hour, a vacuum was then established down to 0.45-0.5 mm of mercury and polycondensation was then carried out for 3 hours under these conditions. The reaction mass obtained upon completion of the reaction was very viscous. The product was pliable and homogeneous and retained good properties up to 150°-160° C. The characteristics are also reported in the Table which follows.

EXAMPLE 10

Preparation of polyesteramide (reactants identical to those used in Example 9, but the percentages of units are different: composition of ester units/amide units = 75/25 by weight)

The following ingredients were introduced into a reactor identical to that described in Example 6:

| | |
|---|---|
| Prepolyamide of molecular weight 2,500, containing OH end groups: | 10 g |
| Prepolyester of molecular weight 2,500, containing OH end groups: | 30 g |
| Hexane-1,6-diol: | 1.6 g |
| Titanium glycolate: | 10 mg |

The procedure was identical to that described in Example 9. Polycondensation was carried out at 260° C. for 5 hours under 0.3-0.4 mm Hg. The product was obtained upon completion of the reaction was very viscous, pliable and homogeneous and retained good mechanical properties up to 120°-130° C. The characteristics are also reported in the Table which follows.

TABLE

| EXAMPLE | Inherent viscosity in a 0.5% strength solution in m-cresol at 25° C., in dl/g | *Thermal characteristics of the melting endotherms | Softening point (Kofler bench), °C. | Thermomechanical characteristics under torsion using an automatic pendulum | | | |
|---|---|---|---|---|---|---|---|
| | | | | Tg °C. | Modulus under torsion, MPa | | |
| | | | | | −20° C. | 0° C. | 20° C. |
| 1 | 0.6 | not observed | 45-50 | −50 | 60 | 32 | 29 |
| 2 | 0.71 | not observed | 45-50 | −50 | 10 | 9 | 9 |
| 3 | 0.84 | 55° C. | 50 | −49 | 8.5 | 8.3 | 8 |
| 4 | 1.18 | 17° C. | 50-60 | −75 | 40 | 23 | 5.5 |
| 5 | 1.12 | — | 50-60 | −74 | 40 | 10 | 8 |
| 6 | | not observed | 150-160 | −55 | 20 | 15 | 14 |
| 7 | | 17°C.-210° C. | 180 | −44 | 250 | 102 | 65 |
| 8 | | 197° C. | 180 | −65 | — | — | — |
| 9 | 0.93 | 217° C. | 150-160 | −59 | 70 | 50 | 40 |
| 10 | 0.60 | | 120-130 | −59 | 9 | 7 | 6.5 |

*The thermal characteristics are determined by differential microcalorimetry under nitrogen, utilizing a temperature increase of 10° C. per minute.

While the invention has been describd in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A random or regularly recurring block polyesteramide having a glass transition temperature of −30° C. or less, which comprises the polymerization product of (i) essentially difunctional monomers comprising at least one carboxylic acid function, or ester/amide-forming derivative thereof, at least 1 mol % of which comprising dicarboxylic acids or such derivatives thereof and having from 20 to 60 carbon atoms, with the amount of monofunctional carboxylic acids comprising said carboxyl monomers being less than about 1% by weight and the amount of carboxylic acids having in excess of two functional groups being less than about 5% by weight, and (ii) a member selected from group consisting of dihydroxyl and diamino comonomers therefor, or aminoalcohol comonomers, or mixtures of diamino and aminoalcohol comonomers.

2. The polyesteramide as defined by claim 1, comprising from 20 to 80% by weight of ester segments.

3. The polyesteramide as defined by claim 2, comprising from 50 to 80% by weight of ester segments.

4. The polyesteramide as defined by claim 2, the dicarboxylic acid having from 20 to 60 carbon atoms being a fatty acid dimer.

5. The polyesteramide as defined by claim 4, the amount of fatty acid dimer being in excess of 10 mol % of the difunctional monomers comprising at least one carboxylic acid function.

6. The polyesteramide as defined by claim 1, the amount of monofunctional carboxylic acids comprising said carboxyl reactants being less than about 0.2% by weight.

7. The polyesteramide as defined by claim 6, the amount of carboxylic acids having in excess of two functional groups being less than about 3% by weight.

8. The polyesteramide as defined by claim 2, the comonomers (ii) comprising dihydroxyl and diamino comonomers, and said dihydroxyl comonomers essentially consisting of polytetramethylene glycols having molecular weights ranging from 500 to 5,000.

9. The polyesteramide as defined by claim 2, the essentially difunctional monomers (i) essentially consisting of a mixture of dimeric acids and linear acids having from 2 to 12 carbon atoms, or ester- or amide-forming derivatives thereof.

10. The polyesteramide as defined by claim 2, the essentially difunctional monomers (i) essentially consisting of a mixture of dimeric acid and aromatic diacids, or ester- or amide-forming derivatives thereof.

11. The polyesteramide as defined by claim 2, the essentially difunctional monomers (i) essentially consisting of a mixture of dimeric acid and a lactam or aminoacid having no more than 12 carbon atoms.

12. The polyesteramide as defined by any of claims 9, 10 or 11, the comonomers (ii) comprising dihydroxyl and diamino comonomers.

13. The polyesteramide as defined by claim 12, the dihydroxyl comonomer being tetramethylene glycol.

14. The polyesteramide as defined by claim 1, the essentially difunctional monomers (i) comprising hydrogenated oleic and linoleic acids containing from 1 to 15% by weight monobasic acid, 80 to 98% by weight dibasic acid, and 1 to 25% by weight of at least tribasic acid.

15. The polyesteramide as defined by claim 2, comprising polyester blocks.

16. The polyesteramide as defined by claim 2, comprising polyamide blocks.

17. A shaped article comprising the polyesteramide as defined by claim 1.

18. A coating composition comprising the polyesteramide as defined by claim 1.

19. An adhesive comprising the polyesteramide as defined by claim 1.

* * * * *